United States Patent
Pal et al.

(10) Patent No.: US 9,942,284 B2
(45) Date of Patent: Apr. 10, 2018

(54) WEBRTC CALL RECORDING AT THE EDGE OF AN ENTERPRISE NETWORK

(71) Applicant: Avaya Inc., Basking Ridge, NJ (US)

(72) Inventors: Biswajyoti Pal, Maharashtra (IN); Manish Chatterjee, Calcutta (IN); Jaydeep Deepak Bhalerao, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 58 days.

(21) Appl. No.: 14/832,573

(22) Filed: Aug. 21, 2015

(65) Prior Publication Data

US 2017/0054769 A1 Feb. 23, 2017

(51) Int. Cl.
*H04L 12/66* (2006.01)
*H04L 29/06* (2006.01)

(52) U.S. Cl.
CPC ...... *H04L 65/1096* (2013.01); *H04L 65/1063* (2013.01); *H04L 65/1069* (2013.01)

(58) Field of Classification Search
CPC combination set(s) only.
See application file for complete search history.

(56) References Cited

U.S. PATENT DOCUMENTS

| | | | |
|---|---|---|---|
| 9,258,292 B2* | 2/2016 | Li | H04L 63/08 |
| 9,363,133 B2* | 6/2016 | Yoakum | H04L 29/08054 |
| 9,380,030 B2* | 6/2016 | Ezell | H04L 63/029 |
| 2014/0270104 A1* | 9/2014 | O'Connor | H04M 3/5175 379/85 |
| 2016/0134659 A1* | 5/2016 | Reddy | H04L 63/20 726/1 |
| 2016/0294786 A1* | 10/2016 | Marquez Mendoza | H04L 63/0428 |

OTHER PUBLICATIONS

Johnston et al, Taking on WebRTC in an Enterprise, IEEE, 7 pages, Apr. 2013.*
Fischl et al, Framework for Establishing a Secure Real-time Transport Protocol (SRTP) Security Context Using Datagram Transport Layer Security (DTLS), RFC 5763, 37 pages, May 2010.*
Johnston et al, Taking on WebRTC in an Enterprise, IEEE, pp. 48-54, 2013.*
Gruen et al, Interactive RTP services with Predictable Reliability, IEEE, 5 pages, 2013.*
Fernandez et al, Kurento: a media server technology for convergent WWW/mobile real-time multimedia communications supporting WebRTC, IEEE, 6 pages, 2013.*

* cited by examiner

*Primary Examiner* — Frank Duong (57) ABSTRACT

Embodiments disclosed herein provide systems and methods for recording WebRTC communications at a network edge. In a particular embodiment a method provides, in an edge system of a communication network, receiving identification information that identifies a first endpoint and a second endpoint between which a first WebRTC communication will be established. The method further provides establishing the first WebRTC communication between the first and second endpoints through the edge system using the identification information. Also, the method provides identifying packets for the first WebRTC communication and recording the packets to a storage system.

19 Claims, 7 Drawing Sheets

WEBRTC CALL RECORDING AT THE EDGE OF AN ENTERPRISE NETWORK

TECHNICAL FIELD

Aspects of the disclosure are related to recording WebRTC communications and, in particular, to recording WebRTC communications from a network edge system.

TECHNICAL BACKGROUND

In many situations, user communications to and from an enterprise network may be recorded. For example, contact centers will often record communications with agents working therein for quality or training purposes. Session Initiation Protocol (SIP) is a common means for facilitating a packet based communication. However, Web Real-Time Communication (WebRTC) is becoming increasingly popular to increase customer interaction through an enterprises website. Thus, many modern contact centers are now configured to handle WebRTC communications with customers.

While these modern contact centers may be segregated by communication type (e.g. SIP based, WebRTC based, etc.), a contact center may be configured to communicate using multiple communication types. For example, a contact center may be setup such that agents working therein can handle both SIP voice calls and WebRTC calls. Moreover, a contact center will likely record communications between agents and customers for quality, training, or some other purpose. Even if the contact center's communication system is configured to record the SIP communications, it may not be configured to record WebRTC communications.

Overview

Embodiments disclosed herein provide systems and methods for recording WebRTC communications at a network edge. In a particular embodiment a method provides, in an edge system of a communication network, receiving identification information that identifies a first endpoint and a second endpoint between which a first WebRTC communication will be established. The method further provides establishing the first WebRTC communication between the first and second endpoints through the edge system using the identification information. Also, the method provides identifying packets for the first WebRTC communication and recording the packets to a storage system.

In some embodiments, the first WebRTC communication comprises a secured WebRTC communication having a first unique fingerprint attribute for the first endpoint, a second unique fingerprint attribute for the second endpoint, and a third unique fingerprint attribute for the edge system. Also, the identification information comprises the first and second unique fingerprint attributes.

In some embodiments, the method further provides transferring the third unique fingerprint attribute from the edge system to the first and second endpoints, wherein the edge system terminates the first WebRTC communication between the first and second endpoints.

In some embodiments, the identification information is received from a WebRTC application system that facilitates the first WebRTC communication.

In some embodiments, recording the packets to the storage system comprises establishing a second WebRTC communication between the edge system and a recording system having the storage system. Additionally, in those embodiments, the method provides transferring copies of the packets from the edge system to the recording system as part of the second WebRTC communication.

In some embodiments, the method provides transferring additional information related to the first WebRTC communication to the recording system via a signaling session with a WebRTC application system that facilitates the first WebRTC communication.

In some embodiments, recording the packets to the storage system comprises transferring copies of the packets using Real-time Transport Protocol (RTP) to a recording system having the storage system and including a first instruction to start recording in an RTP extension of at least the first RTP packet of the copies of the packets that are transferred. In those embodiments, the recording system monitors RTP packets for instructions in the RTP extension and begins storing the copies of the packets upon detecting the first instruction.

In some embodiments, recording the packets to the storage system further comprises, after at least the first RTP packet is transferred, including a second instruction to stop recording in the RTP extension of at least a second RTP packet of the copies of the packets. In those embodiments, the recording system stops storing the copies of the packets upon detecting the second instruction.

In some embodiments, the first instruction is included in the first two or more RTP packets of the copies of the packets that are transferred.

In some embodiments, the method provides including additional information related to the first WebRTC communication in the RTP extension.

In another embodiment, an edge system comprising a communication interface and a processing system is provided. The communication interface is configured to receive identification information that identifies a first endpoint and a second endpoint between which a first WebRTC communication will be established and establish the first WebRTC communication between the first and second endpoints through the edge system using the identification information. The processing system is configured to identify packets for the first WebRTC communication and record the packets to a storage system.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

WebRTC (Web Real-Time Communication) was developed to facilitate real-time communications, audio, video, or otherwise, between web browsers. In some cases, an enterprise will operate its own system for managing WebRTC communications and installs that system in its network. A typical characteristic with enterprise networks is that most of the network elements therein lay behind one or more edge systems. These edge systems are able to regulate communication traffic flowing into and out of the enterprise network. For example, an edge system may implement a firewall to protect adverse traffic, such as malware or undesired network services, from entering the enterprise network.

Since all of the network traffic going to and coming from the enterprise network will pass through an edge system, edges systems are well positioned to record that network traffic. In particular, as is the subject of this disclosure, the traffic comprises WebRTC communications between one or more WebRTC systems within an enterprise network and one or more WebRTC systems outside of the enterprise network. The WebRTC communications may include audio (e.g. voice), video, file transfer, or some other type of media communications—including combinations thereof. In some cases, an enterprise may want to record WebRTC communications between in network and out of network WebRTC client systems. For example, the enterprise may operate a contact center staffed with agents that operate WebRTC client systems on the contact center's network to communicate with users outside of the contact center. As is the case with more traditional contact centers (e.g. circuit switched call centers), an enterprise may want for communications between agents and outside users to be recorded for quality assurance, training purposes, or some other reason.

Regardless of the reason for recording WebRTC communications, the WebRTC communications exchanged with outside client systems will pass through an edge system that regulates traffic into and out of an enterprise network of which the edge system is a part. The edge system described below is configured to recognize WebRTC communications and record those communications for later use, reference, or for some other reason. Moreover, the same approach taken by the edge system to record WebRTC communications is actually agnostic to the communications being WebRTC. Thus, the edge system can also be used to record other types of communications, such as SIP.

Figure 1:
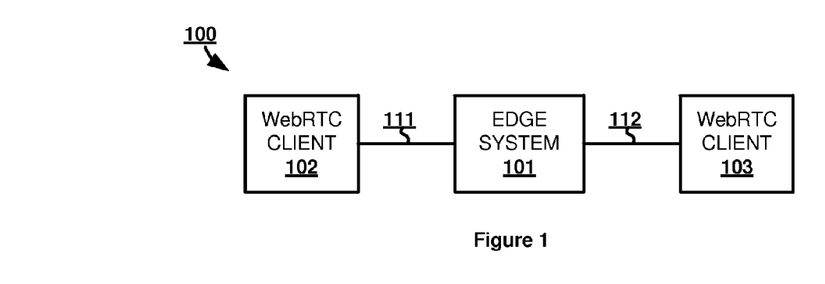
FIG. 1 illustrates a WebRTC communication environment for recording WebRTC communications at a network edge.

FIG. 1 illustrates WebRTC communication environment 100 for recording WebRTC communications at a network edge in an operational scenario. WebRTC communication environment 100 includes edge system 101, WebRTC client system 102, and WebRTC client system 103. Edge system 101 and WebRTC client system 101 communicate over communication link 111. Edge system 101 and WebRTC client system 102 communicate over communication link 112.

In operation, WebRTC client system 103 is located within an enterprise network that includes edge system 101 at an ingress/egress point of the enterprise network. It should be understood that, while the networks herein are described as enterprise networks, the term enterprise network is intended to describe any network having similar structure regardless of whether an enterprise operates the network. WebRTC client system 103 may be a user device endpoint that executes a web browsing application or a dedicated WebRTC application that allows the device to exchange WebRTC communications with other endpoints. Alternatively, WebRTC client system 103 may be a WebRTC gateway that translates WebRTC communications to and from another communication format, or some other type of system that exchanges WebRTC communications. WebRTC client system 102 is located outside of the enterprise network but may also be a user device endpoint, WebRTC gateway, or other type of WebRTC communication system. In one example, a user of WebRTC client system 102 may direct a web browser on client system 102 to a particular website and that website may include a button, link, or other selectable element, that the user selects to initiate a WebRTC communication (audio, video, text, or otherwise) with another WebRTC endpoint.

Though not shown, the enterprise network in which WebRTC client system 103 is located may also include a WebRTC application system that facilitates WebRTC communications between other WebRTC client systems, WebRTC gateways, or other type of WebRTC communication system—including combinations thereof. In one example, the WebRTC application system may manage WebRTC communications between employees of an enterprise, such as contact center agents, and people outside of the enterprise, such as customers.

Figure 2:
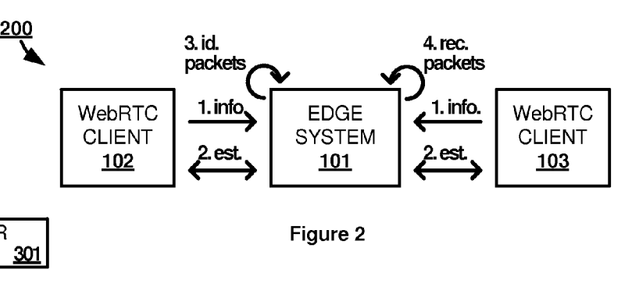
FIG. 2 illustrates an operation of the WebRTC communication environment to record WebRTC communications at a network edge.

FIG. 2 illustrates an operation 200 of WebRTC environment 100 to record WebRTC communications at a network edge. At step 1, edge system 101 receives identification information from each of WebRTC client systems 102 and 103. The identification information includes any type of identifying information that edge system 101 can use to identify WebRTC communications exchanged between systems 102 and 103. In one example, each respective client system uses a unique fingerprint attribute for communicating using a secure connection protocol, such as a Datagram Transport Layer Security (DTLS) protocol. In particular, the fingerprint attribute may be transferred using the Session Description Protocol (SDP) and include a key used during a DTLS handshake.

At step 2, a WebRTC communication is established between WebRTC client systems 102 and 103 though edge system 101. While illustrated sequentially, the identification information received in step 1 may be received during a process for establishing the WebRTC communication in step 2. For example, as the fingerprints for each WebRTC client system are exchanged to set up links for the WebRTC communication, the fingerprints may be transferred to edge system 101 on an out of band link, such as a Representational State Transfer (REST) link.

Once the WebRTC communication is established, edge system 101 identifies packets for the WebRTC communication at step 3. The packets carry the voice, video, text, files, or any other type of media capable of being exchanged for users by WebRTC—including combinations thereof. The packets are identified based on the identification information in such a way that edge system 101 does not need to analyze the content payload of each packet. For example, the identification information for at least one of the client systems may be included in a header entry of each packet. In an alternative example, edge system 101 may use the identification information to act as a man-in-the-middle system on the WebRTC communication. Regardless, edge system 101 does not need to be aware of the payload contents of the identified packets to understand that the packets are transporting communications for the WebRTC communication between WebRTC client systems 102 and 103. Likewise, the ability of edge system 101 to identify the packets for the WebRTC communication using the identification information allows edge system 101 to not have the ability to decode the WebRTC communications themselves. Furthermore, this allows edge system 101 to identify packets in the same manner for types of communications other than WebRTC communication, as long as similar identification information is used.

The identified packets are recorded to a storage system at step 4. Step 4 may be performed at substantially the same time as step 3 so that packets are recorded as they are identified. The storage system may be located internally to edge system 101 or may be located in some other system in communication with edge system 101, such as a dedicated recording system. As the WebRTC communication should not be interrupted due to recording the packets, when a packet is identified, a copy is created for recording to the storage system. The copy may be an exact copy of the identified packet, may be a new packet repackaging a copy of the identified packet's payload, or may take some other form.

Figure 3:
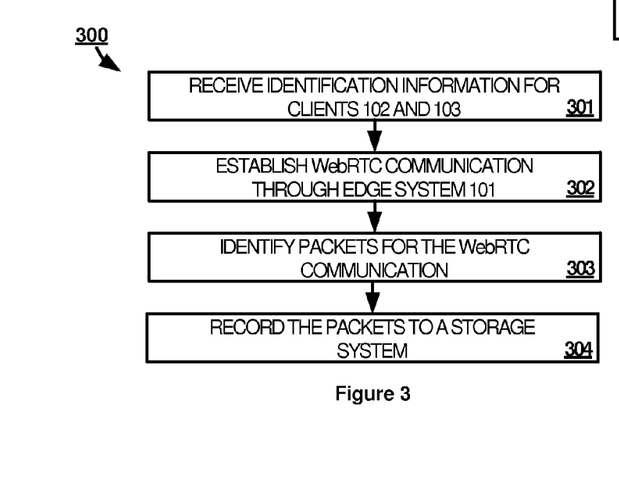
FIG. 3 illustrates a method of operating the WebRTC communication environment to record WebRTC communications at a network edge.

FIG. 3 illustrates a method 300 of operating WebRTC environment 100 to record WebRTC communications at a network edge. In particular, method 300 provides edge system 101 receiving identification information that identifies a first endpoint and a second endpoint between which a WebRTC communication will be established (step 301). In this example, the first and second endpoints are WebRTC client systems 102 and 103. Method 300 further provides establishing the WebRTC communication between the first and second endpoints through edge system 101 using the identification information (step 302). Once the WebRTC communication is established, method 300 provides edge system 101 identifying packets for the first WebRTC communication (step 303) and recording the packets to a storage system (step 304).

Advantageously, since all packets for the WebRTC communication pass through edge system 101 when going to or from WebRTC client system 103, edge system 101 is well situated to record any WebRTC communication for which client system 103 is a part. Edge system 101 may also record WebRTC communications between other WebRTC client systems within the same enterprise network as system 103 and outside WebRTC client systems using method 300 due to edge systems 101's position at the edge of the enterprise network. Moreover, it should be understood that edge system 101 may record WebRTC communications that occur between more than two endpoints in the same manner described herein as long as at least one endpoint is within the enterprise network and at least one endpoint is outside of the enterprise network so that the WebRTC communication need pass through edge system 101. Edge system 101 would use identification information from the additional WebRTC client systems in the same manner as for client systems 102 and 103 to differentiate between WebRTC communication sessions.

Referring back to FIG. 1, edge system 101 comprises a computer processing system and communication interface. Edge system 101 may also include other components such as a router, server, data storage system, and power supply. Edge system 101 may reside in a single device or may be distributed across multiple devices. Edge system 101 may comprise a communication gateway, firewall, Traversal Using Relays around NAT (Network Address Translation) (TURN) server, Representational State Transfer (REST) server, proxy server, or some other networking system—including combinations thereof.

WebRTC client systems 102 and 103 each comprise communication circuitry and processing circuitry. The communication circuitry may include wired communication components and/or wireless communication components, such as an amplifier, filter, modulator, and signal processing circuitry. WebRTC client systems 102 and 103 may also include a user interface, memory device, software, or some other communication components. WebRTC clients 103 may be a telephone, tablet, watch, computer, gateway, e-book, mobile Internet appliance, network interface card, media player, game console, or some other communication apparatus—including combinations thereof.

Communication links 111 and 112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111 and 112 could be direct links or may include intermediate networks, systems, or devices.

Figure 4:
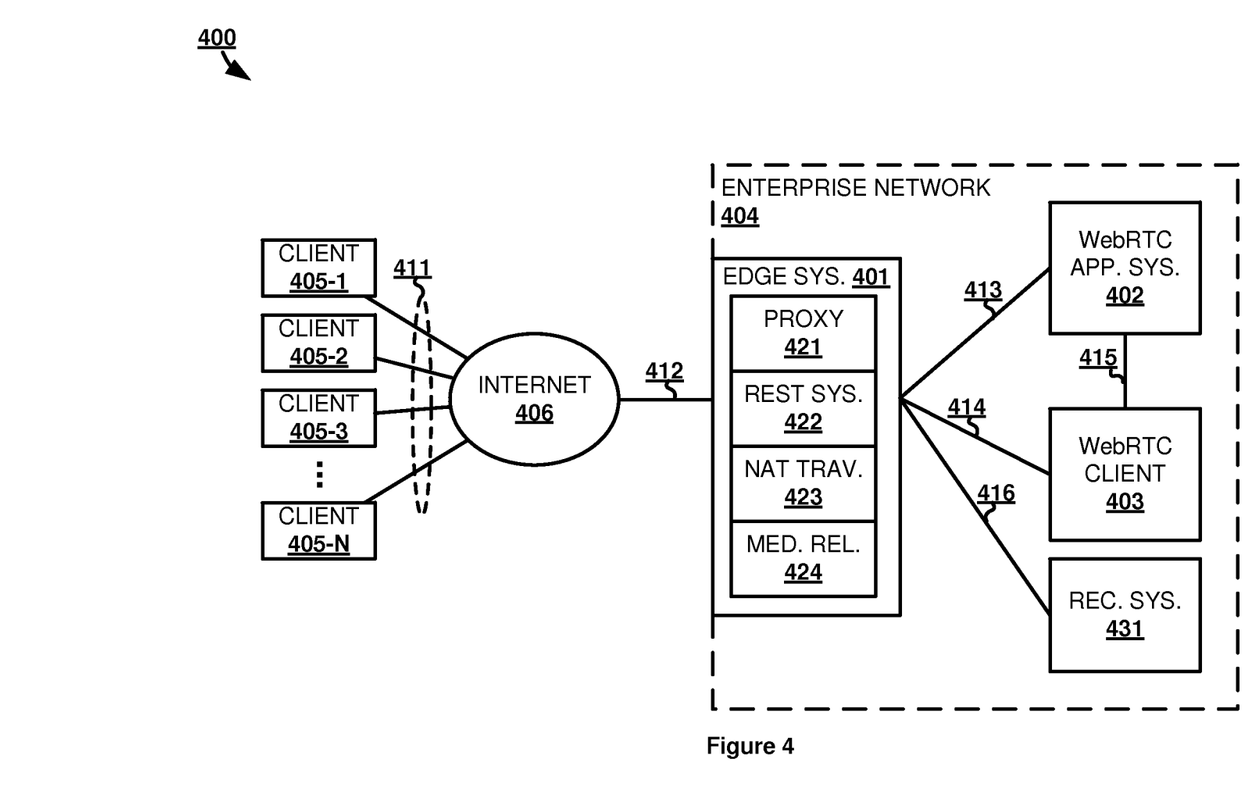
FIG. 4 illustrates another WebRTC communication environment for recording WebRTC communications at a network edge.

FIG. 4 illustrates WebRTC environment 400 in an operational scenario. WebRTC environment 400 includes edge system 401, WebRTC application system 402, WebRTC client system 403, and recording system 431, which are included in enterprise network 404. Edge system 401 includes proxy system 421, REST system 422, NAT traversal system 423, and Media Relay 424. WebRTC environment 400 further includes client devices 405 and Internet 406. Client device 405 and Internet 406 communicate over communication links 411. Internet 406 and edge system 401 communicate over communication link 412. Edge system 401 and WebRTC application system 402 communicate over communication link 413. Edge system 401 and WebRTC client system 403 communicate over communication link 414. WebRTC client system 403 and WebRTC application system 402 communicate over communication link 415. Edge system 401 and recording system 431 communicate over communication link 416.

Ideally, client devices 405 each comprise user devices configured to use WebRTC to exchange user communications with WebRTC client system 403 (e.g. via a web browser or dedicated WebRTC application executing thereon) and facilitated by WebRTC application system 402. WebRTC client system 403 may include one or more client devices operated by users, such as contact center agents that are associated with the enterprise, a Session Initiation Protocol (SIP) gateway, an H.323 gateway, or any other type of system that can act as a WebRTC endpoint.

In a contact center example, the operator of the contact center may wish to record communications between agents and customers. Thus, since each customer will use a WebRTC client systems 405 outside of enterprise network 404 to communicate with an agent through WebRTC client system 403, all of those communications will pass through edge system 401. Of course, edge system 401 is properly positioned to record communications traversing into or out of network 404 regardless of the reason for recording.

Figure 5:
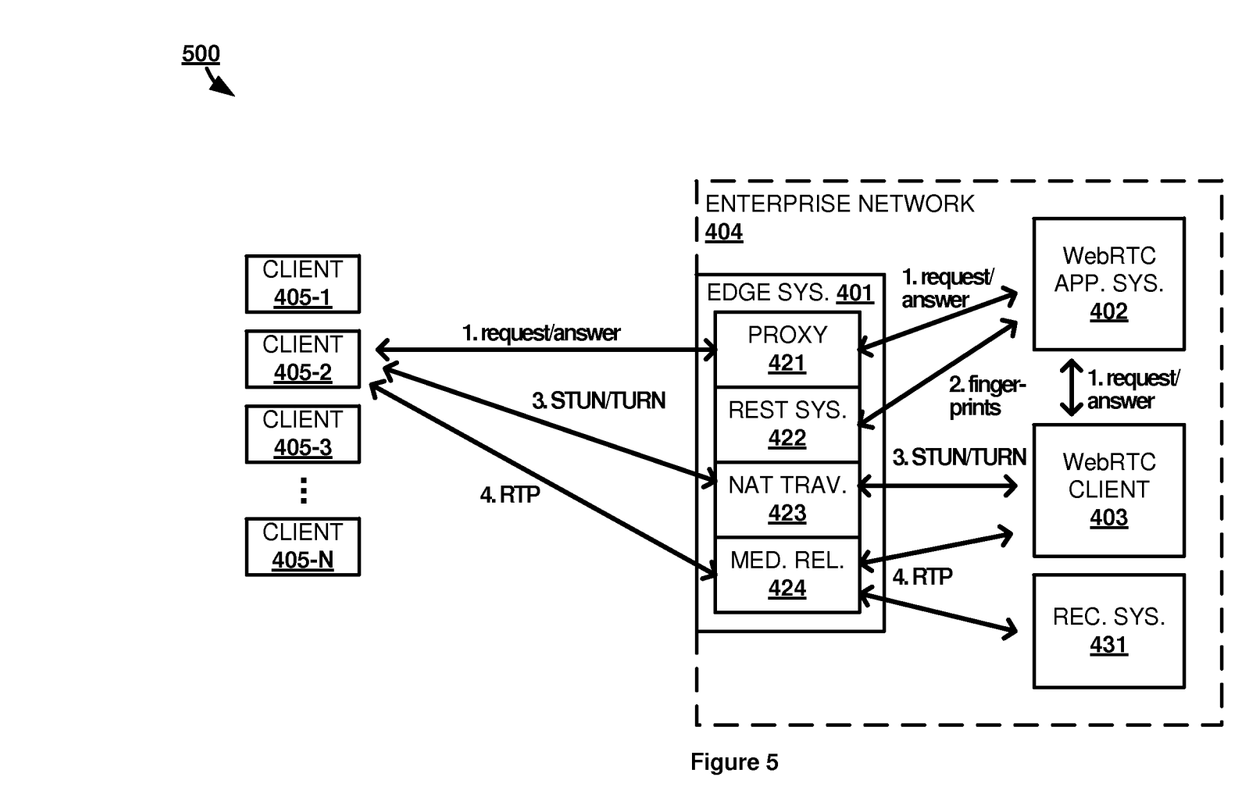
FIG. 5 illustrates an operation of the other WebRTC environment to record WebRTC communications at a network edge.

FIG. 5 illustrates an operation 500 of WebRTC environment 400 to record WebRTC communications at a network edge. In particular, operation 500 shows which elements of edge system 401 communicate with other systems to perform the operations illustrated in FIGS. 6-8. This example and the examples of FIGS. 6-8 focuses on a WebRTC communication between WebRTC client system 405-2 and WebRTC client system 403. However, the same link arrangement would be used for communications with any one of WebRTC client systems 405.

Connection 1 shows that requests to establish a communication with a WebRTC client system, and answers to those requests, traverse through edge system 401 via proxy system 421. The requests and answers are relayed by WebRTC application system 402, which facilitates the establishment of the WebRTC communication. During establishment of the WebRTC communication unique fingerprints for WebRTC client system 405-2 and 403, respectively, are used to create a secure connection over which the WebRTC communications will be transferred. Connection 2 shows that those fingerprints are transferred via out of band REST messages between REST system 422 and WebRTC application system 402. Likewise, if a fingerprint is needed for edge system 401 to act as a man-in-the-middle system, then edge system 401 also transfers its fingerprint to WebRTC application system over the REST link.

Connection 3 shows that any Session Traversal Utilities for NAT (STUN) or TURN messages between WebRTC client systems 405-2 and 403 traverse NAT traversal system 423 as would occur normally. when setting up a communication through edge system 401. User communications for the WebRTC communication are then transferred using Real-time Transport Protocol (RTP) and traverse media relay 424, as shown by connection 4. The user communications may comprise audio, video, text, or other type of media format—including combinations thereof. Since edge system 401 is configured to record WebRTC communications, RTP packets are also sent to recording system 431, which includes a storage system such as flash memory, hard drive(s), magnetic tape, or some other medium for storing digital information.

Figure 6:
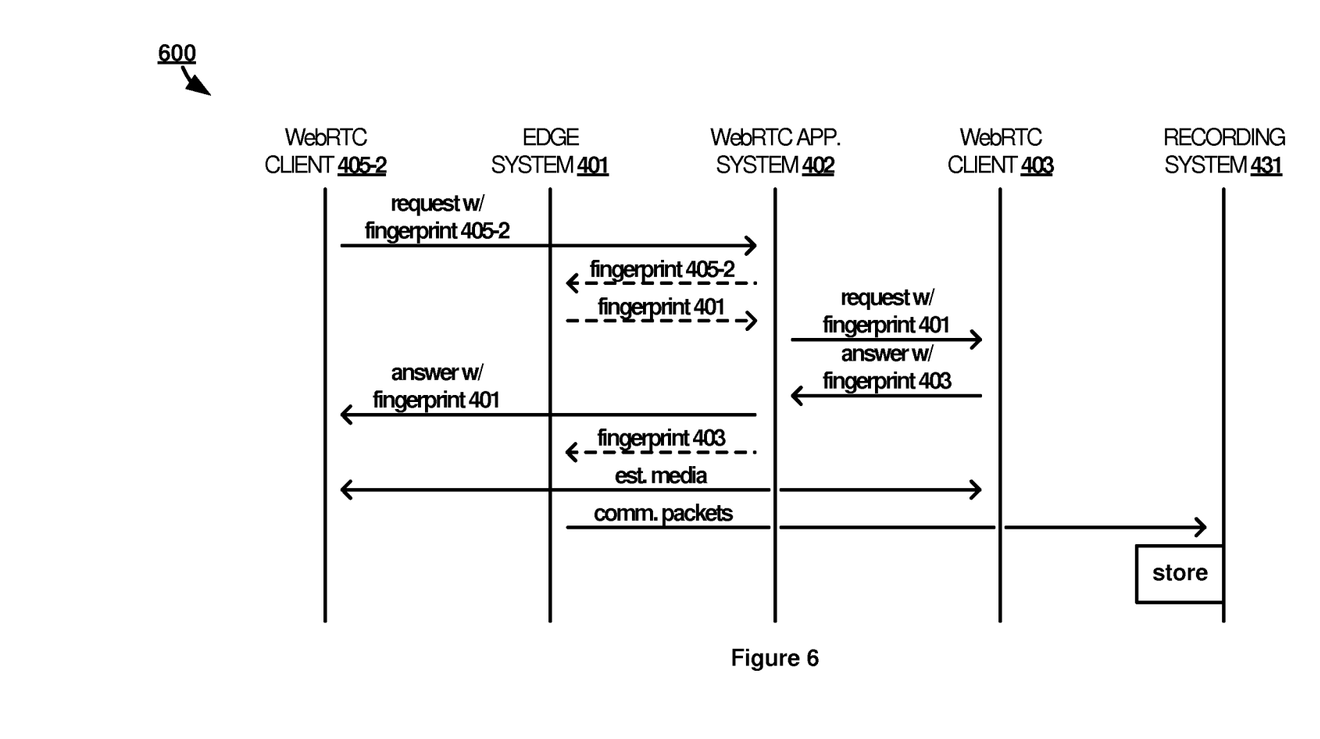
FIG. 6 illustrates an operation of the other WebRTC environment to record WebRTC communications at a network edge.

FIG. 6 illustrates an operation 600 of WebRTC environment 400 to record WebRTC communications at a network edge. In operation 600, WebRTC client system 405-2 transfers a request for a WebRTC communication to WebRTC application system 402 through HTTP reverse proxy 421 of edge system 401. The request may be transferred at the instruction of a user of WebRTC client system 405-2. For example, the user may be using a web browser executing on system 405-2 and may select a link in a webpage displayed using the browser. By selecting that link, the web browser is directed to transfer the WebRTC communication request using Hypertext Transfer Protocol (HTTP) to WebRTC application system 402. The request may be for an audio communication, video communication, text communication, or any other media type allowed by WebRTC. In some cases, the type of media used for WebRTC communication is determined or may be changed after the WebRTC communication has been established.

In this example, the request includes an offer in SDP with a DTLS fingerprint of WebRTC client system 405-2. This fingerprint is used to identify WebRTC client system 405-2 during communications over a DTLS connection. Client systems without the fingerprint of system WebRTC client system 405-2 cannot transfer or receive communications on behalf of system 405-2.

Upon receiving the request and fingerprint from WebRTC client system 405-2, WebRTC application system 402 uses REST to transfer the fingerprint of WebRTC client system 405-2 to REST system 422 of edge system 401. Edge system 401 also uses REST to send a DTLS fingerprint of edge system 401 back to WebRTC application system 402. Specifically, the fingerprint of edge system 401 comprises the fingerprint of media relay 424.

After receiving the fingerprint of edge system 401, WebRTC application system 402 transfers the request for a WebRTC communication on to WebRTC client system 403. Instead of including the fingerprint of WebRTC client system 405-2 in the request, WebRTC application system 402 has replaced it with the fingerprint of edge system 401. WebRTC client system 403 may be the only client system located within enterprise network 404 or WebRTC application system 402 may transfer the request to WebRTC client system 403 after selected system 403 from multiple WebRTC client systems within enterprise network 404 that are operated by agents. Alternatively, WebRTC client system 403 may be a gateway system that itself routes WebRTC communications to other agent systems (e.g. using SIP or some other communication format).

WebRTC client system 403 then transfers an answer to the request along with a DTLS fingerprint of WebRTC client system 403 to WebRTC application system 402. For the purposes of this example, it is assumed that the answer indicates that WebRTC client system 403 is accepting the request for the WebRTC communication. Thus, WebRTC application system 402 transfers the answer to WebRTC client system 405-2. However, WebRTC application system 402 includes the fingerprint of edge system 401 in place of the fingerprint of WebRTC client system 403. WebRTC application system 402 also uses REST to send the fingerprint of WebRTC client system 403 to edge system 401.

Once the request, answer, and fingerprints have been exchanged, a link for carrying media for the requested WebRTC communication can be established over a DTLS link. In this example, edge system 401 and, specifically, media relay 424 act as a man-in-the-middle system on the WebRTC communication. Since edge system 401 has the fingerprints for both WebRTC client systems 405-2 and 403, and since systems 405-2 and 403 only have the fingerprint of edge system 401, systems 405-2 and 403 are only able to transfer their communications to edge system 401, which forwards them along to the intended recipient. Thus, the packets carrying user communication media between WebRTC client systems 405-2 and 403 are unaffected by edge system 401 being in the middle of the DTLS communication path.

Another benefit of this configuration allows edge system 401 to easily identify the packets transferred between WebRTC client systems 405-2 and 403 as part of the WebRTC communication. Thus, to record the packets, and inherently the WebRTC communication itself, edge system 401 merely copies the packets before forwarding them along. In order to then store the copied packets, edge system 401 transfers the copied packets to recording system 431. The copied packets may be transferred using an RTP link to recording system 431 or may be transferred using some other communication format. In one example, edge system 401 may initiate a second WebRTC communication between edge system 401 and recording system 431. WebRTC application system 402 may facilitate this second WebRTC communication. Regardless, the packets exchanged on this second WebRTC communication carry at least the payload of the copied packets from the WebRTC communication between WebRTC client systems 405-2 and 403. Upon receiving the copied packets, recording system 431 stores the copied packets on a storage system, which may include one or more hard drives, flash memory, magnetic tape, or some other storage format—including combinations thereof.

In some embodiments, edge system 401 further transfers additional information related to the WebRTC communication between WebRTC client systems 405-2 and 403. This additional information may include information about users operating WebRTC client systems 405-2 and 403, may include information about WebRTC client system 405-2's browsing experience (e.g. what pages were navigated before the WebRTC communication link was clicked), WebRTC communication history for one or more of systems 405-2 and 403, or any other type of information relevant to the WebRTC communication—including combinations thereof. In some examples, WebRTC application system 402 may be in communication with recording system 431 and, therefore, may provide at least a portion of the additional information to recording system 431. The additional information may be stored by recording system 431 as data objects that are associated with the WebRTC communication using a session identifier for the WebRTC communication. Thus, the WebRTC communication recording itself and the additional information can be retrieved using the session identifier.

Using operation 600 to record the WebRTC communication allows the WebRTC communication to be recorded from edge system 401 without the need for edge system 401 to be configured for interpreting WebRTC packets. Rather, edge system 401 need simply be configured to participate in a DTLS communication link. Moreover, while the examples herein use WebRTC specifically, this capability allows edge system 401 to be protocol agnostic when copying communication for recording system 431. That is, edge system 401 can use operation 600 to record packet communications using any protocol (e.g. SIP) over a DTLS link.

Figure 7:
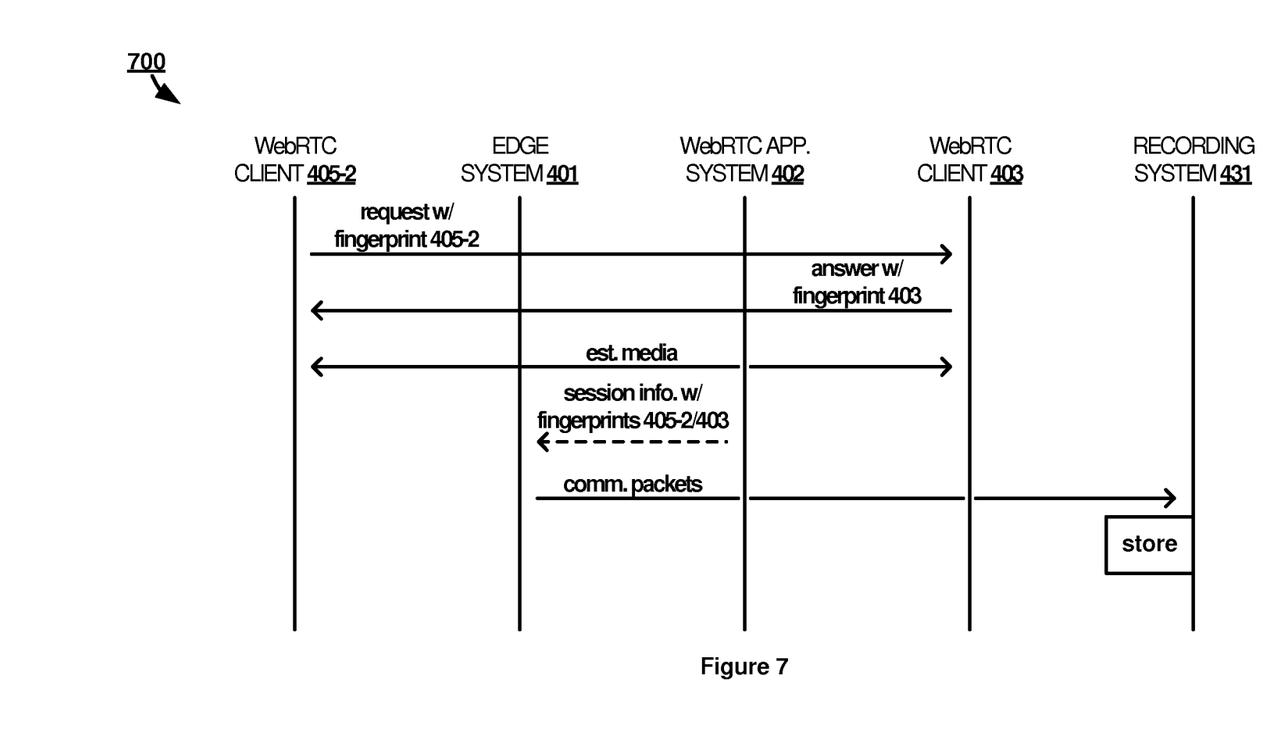
FIG. 7 illustrates an operation of the other WebRTC environment to record WebRTC communications at a network edge.

FIG. 7 illustrates another operation 700 of WebRTC environment 400 to record WebRTC communications at a network edge. In operation 700, edge system 401 does not position itself as a man-in-the-middle system on the WebRTC communication between WebRTC client systems 405-2 and 403. Rather, edge system 401 uses the fingerprints of each of client systems 405-2 and 403 to identify packets for the WebRTC communication.

Specifically, as in operation 600, in operation 700 WebRTC client system 405-2 transfers a request for a WebRTC communication to WebRTC application system 402. The request includes the DTLS fingerprint of WebRTC client system 405-2. In this example, WebRTC application system 402 passes the request along to WebRTC client system 403 with the fingerprint of WebRTC client system 405-2 rather than replacing it with the fingerprint of edge system 401, as was the case in operation 600. WebRTC client system 403 responds to the request with an answer including the DTLS fingerprint of WebRTC client system 403. This answer propagates to WebRTC client system 405-2 with the fingerprint of WebRTC client system 403. The fingerprints are used by the two client systems 405-2 and 403 to create a DTLS link and establish a link for carrying media for the WebRTC communication through media relay 424 of edge system 401.

WebRTC application system 402 uses REST to transfer both the fingerprint of WebRTC client system 405-2 and the fingerprint of WebRTC client system 403 to edge system 401. During the WebRTC communication, edge system 401 is able to identify packets carrying the communications for the WebRTC communication using the fingerprints of each system 405-2 and 403 as identified in the packets. In particular, each packet has an attribute that indicates the fingerprint and edge system 401 reads that attribute to determine whether the fingerprint(s) therein are associated with the WebRTC communication. Based on this identification, the packets are copied, transferred to recording system 431, and stored in the same way as described in operation 600.

Figure 8:
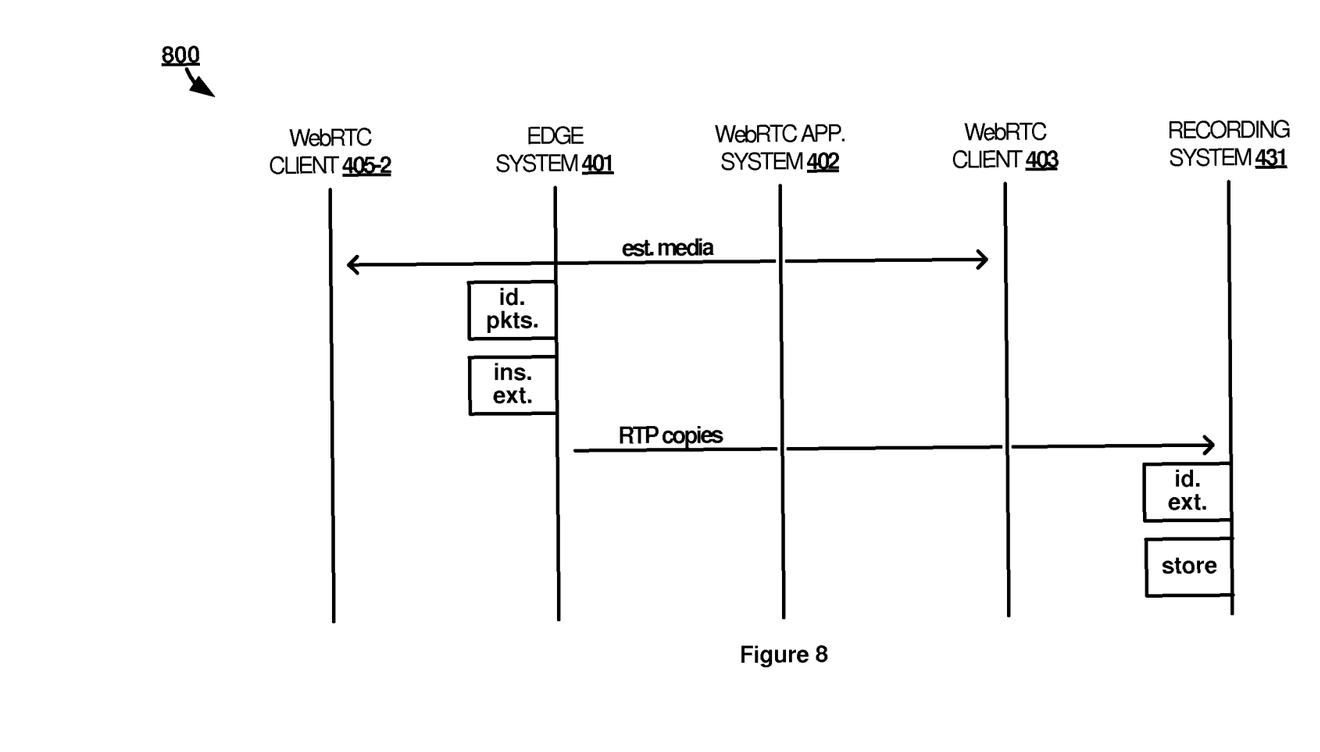
FIG. 8 illustrates an operation of the other WebRTC environment to record WebRTC communications at a network edge.

FIG. 8 illustrates yet another operation 800 of WebRTC environment 400 to record WebRTC communications at a network edge. Operation 800 is an example of how packets are transferred to and recorded by recording system 431, although other methods may be used in its place. In operation 800, recording system 431 monitors a User Datagram Protocol (UDP) port for RTP packets that are transferred to recording system 431 from edge system 401. Specifically, recording system 431 monitors the RTP packets for an RTP extension in the packets that includes instructions about how recording system 431 is supposed to handle the packets. In this manner, recording system 431 does not need to receive anything other than the RTP packets themselves in order to determine how those packets should be handled.

Advantageously, regardless of the type of communication (e.g. WebRTC based, SIP based, or otherwise) for which the media in the RTP packets are carrying, recording system 431 need only be able to comprehend RTP packets to perform its recording functionality. Also, it should be understood that the method for recording RTP packets described in operation 800 may be used to record any RTP packet stream to recording system 431, not just streams of packets from edge system 401. In one example, a SIP communication may be established between a client system within enterprise network 404 and one of clients 405. The media exchanged in association with that SIP communication may be recorded by transferring copies of the media packets to recording system 431 using RTP and controlling the recording using the RTP extension. Likewise, even if the media communication (or other media source) does not use RTP, the media may be converted to RTP and sent to recording system 431 for recording in the same manner.

In a particular example, operation 800 begins after a connection for exchanging media for the WebRTC communication has been established. Edge system 401 identifies the packets carrying the media for the WebRTC communication between WebRTC client systems 405-2 and 403. As noted above in reference to operations 600 and 700, the packets may be identified due to edge system 401 acting as a man-in-the-middle system on the WebRTC communication or may be identified based on the DTLS fingerprint attribute of the packets carrying the media for the WebRTC communication.

Regardless of how the packets for the WebRTC communication are identified, when recording of those packets is to begin, edge system 401 copies those packets and inserts an instruction to begin recording the packets in an RTP extension of those copied packets. Edge system 401 may be configured to record all WebRTC communications with WebRTC client system 403, or just this particular WebRTC communication (e.g. at the instruction of a user or administrator), at the beginning of the WebRTC communication or may be instructed to start recording at a later time. The instruction to start recording the packets may be included in just one of the RTP packets or, due to packet loss that can occur when transferring RTP packets, the instruction may be included in a first N number of packets that are streamed to recording system 431, with N being a number great enough to ensure receipt of the instruction by recording system 431 based on current packet loss conditions on the link between edge system 401 and recording system 431.

The copied packets are streamed by edge system 401 to recording system 431 over an RTP link. Recording system 431 receives the RTP packets and processes them to identify any instruction included in the RTP packet stream. In this example, recording system 431 recognizes the instruction to begin recording the packets and does so to a storage system. Since the instruction to start recording may have been included in N packets, recording system 431 may ignore the instruction to begin recording in packets received subsequently to the first recognized instruction (or may use at least one of the subsequent packets to confirm the instruction). When recording system 431 is to no longer record the packets, edge system 401 may simply stop streaming the packets to recording system 431 or may include an instruction to stop recording packets in the RTP extension of at least one of the packet copies transferred to recording system 401 (may include the stop instruction in N of the final packets to be recorded to account for potential packet loss). In some examples, recording may stop upon the WebRTC communication ending, at a defined time, or upon instruction from a user (e.g. a DTMF key event from a user through WebRTC client system 403). Upon identifying the instruction to stop recording, recording system 431 stops recording the packets accordingly. Thus, even if recording system 431 is receiving the packet copies before or after the start/stop instructions are sent, recording system 431 only records the packets upon identifying an instruction to start recording and until a stop instruction is received or some other stop condition is reached (e.g. a time limit). In some examples, the recording may be started and stopped multiple times during the course of the WebRTC communication.

Additional information related to the context of the recording may also be transferred in the RTP extension while the RTP packets are being streamed to recording system 431. This context information may include other instructions or parameters for recording the RTP packets, or may be information analogous to the additional information described above with respect to operation 600. The context information may indicate audio/video destination, audio sampling rate, instructions regarding video recording aspect ratio (e.g. to maintain or modify), pre-speech/post-speech timeouts, whether to append the media to an existing file or start in new file, image width/height, bitrate for the recording, framerate for the recording, keyframe interval for the recording, instructions to transcode the media, a maximum recording time for the media after which recording ceases, whether to index the file, or any other type of information that may be relevant to the recording of communication media. Recording system 431 may store the additional information, if necessary, as metadata included with a file generated to store the media or may store it as a separate object(s) associated with the file (e.g. associated using a session ID). As with the start and stop instructions described above, the additional information sent to recording system 431 may be included in N number of packets to account for packet loss.

Since operation 800 uses an RTP extension to send instructions and information to recording system 431, if recording system 431 was replaced with a recording system that does not recognize the RTP extension, then that system would simply ignore the RTP extension and perform actions on the received RTP packet stream in accordance with its own configuration.

Figure 9:
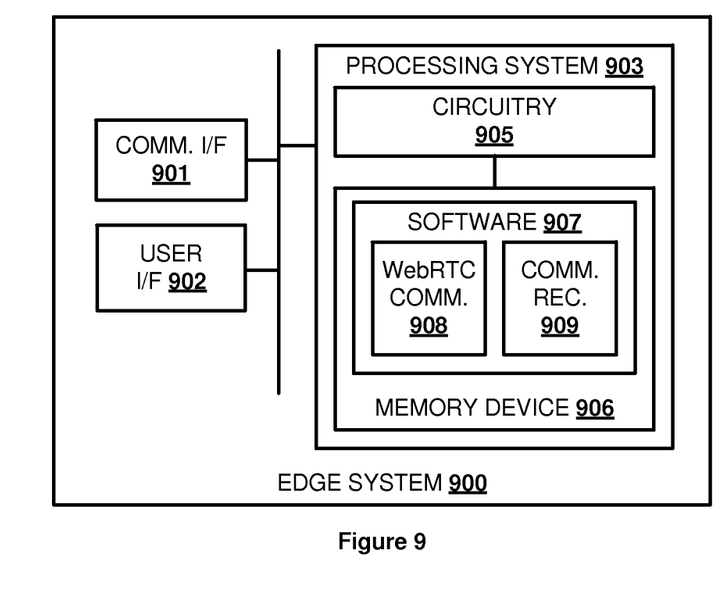
FIG. 9 illustrates an edge system for recording WebRTC communications at a network edge.

FIG. 9 illustrates edge system 900. Edge system 900 is an example of edge systems 101 and 401, although systems 101 and 401 may use alternative configurations. Edge system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Operating software 907 comprises computer programs, firmware, or some other form of machine-readable processing instructions. Operating software 907 includes WebRTC communication module 908 and communication recording module 909. Operating software 907 may further include an operating system, utilities, drivers, network interfaces, applications, or some other type of software. When executed by circuitry 905, operating software 907 directs processing system 903 to operate edge system 900 as described herein.

In particular, WebRTC communication module 908 directs processing system 903 to receive identification information that identifies a first endpoint and a second endpoint between which a first WebRTC communication will be established and to establish the first WebRTC communication between the first and second endpoints through the edge system using the identification information. Communication recording module 909 directs processing system 903 to identify packets for the first WebRTC communication and to record the packets to a storage system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of recording Web Real-Time Communication (WebRTC) communications at an edge of a communication network, the method comprising:
in an edge system of the communication network, receiving identification information that identifies a first endpoint and a second endpoint between which a first WebRTC communication will be established;

establishing the first WebRTC communication between the first and second endpoints through the edge system using the identification information;

identifying packets for the first WebRTC communication; and recording the packets to a storage system by transferring copies of the packets using Real-time Transport Protocol (RTP) to a recording system having the storage system and including a first instruction to start recording in an RTP extension of at least the first RTP packet of the copies of the packets that are transferred, wherein the recording system monitors RTP packets for instructions in the RTP extension and begins storing the copies of the packets upon detecting the first instruction.

2. The method of claim 1, wherein the first WebRTC communication comprises a secured WebRTC communication having a first unique fingerprint attribute for the first endpoint, a second unique fingerprint attribute for the second endpoint, and a third unique fingerprint attribute for the edge system, and wherein the identification information comprises the first and second unique fingerprint attributes.

3. The method of claim 2, further comprising:
transferring the third unique fingerprint attribute from the edge system to the first and second endpoints, wherein the edge system terminates the first WebRTC communication between the first and second endpoints.

4. The method of claim 1, wherein the identification information is received from a WebRTC application system that facilitates the first WebRTC communication.

5. The method of claim 1, wherein the first WebRTC communication comprises a secured WebRTC communication having a first unique fingerprint attribute for the first endpoint, a second unique fingerprint attribute for the second endpoint, and a third unique fingerprint attribute for the edge system, and wherein the identification information comprises the first and second unique fingerprint attributes.

6. The method of claim 5, further comprising:
transferring the third unique fingerprint attribute from the edge system to the first and second endpoints, wherein the edge system terminates the first WebRTC communication between the first and second endpoints.

7. A method of recording Web Real-Time Communication (WebRTC) communications at an edge of a communication network, the method comprising:
in an edge system of the communication network, receiving identification information that identifies a first endpoint and a second endpoint between which a first WebRTC communication will be established;
establishing the first WebRTC communication between the first and second endpoints through the edge system using the identification information;
identifying packets for the first WebRTC communication; and
recording the packets to a storage system by establishing a second WebRTC communication between the edge system and a recording system having the storage system and transferring the copies of the packets from the edge system to the recording system as part of the second WebRTC communication.

8. The method of claim 1, wherein recording the packets to the storage system further comprises:
after at least the first RTP packet is transferred, including a second instruction to stop recording in the RTP extension of at least a second RTP packet of the copies of the packets, wherein the recording system stops storing the copies of the packets upon detecting the second instruction.

9. The method of claim 1, wherein the first instruction is included in the first two or more RTP packets of the copies of the packets that are transferred.

10. The method of claim 1, further comprising:
including additional information related to the first WebRTC communication in the RTP extension.

11. The method of claim 7, further comprising:
transferring additional information related to the first WebRTC communication to the recording system via a signaling session with a WebRTC application system that facilitates the first WebRTC communication.

12. An edge system for recording Web Real-Time Communication (WebRTC) communications at an edge of a communication network, the edge system comprising:
a communication interface configured to receive identification information that identifies a first endpoint and a second endpoint between which a first WebRTC communication will be established and establish the first WebRTC communication between the first and second endpoints through the edge system using the identification information; and
a processing system configured to identify packets for the first WebRTC communication and record the packets to a storage system by transferring copies of the packets using Real-time Transport Protocol (RTP) to a recording system having the storage system and including a first instruction to start recording in an RTP extension of at least the first RTP packet of the copies of the packets that are transferred, wherein the recording system monitors RTP packets for instructions in the RTP extension and begins storing the copies of the packets upon detecting the first instruction.

13. The edge system of claim 12, wherein the first WebRTC communication comprises a secured WebRTC communication having a first unique fingerprint attribute for the first endpoint, a second unique fingerprint attribute for the second endpoint, and a third unique fingerprint attribute for the edge system, and wherein the identification information comprises the first and second unique fingerprint attributes.

14. The edge system of claim 13, further comprising:
the communication interface configured to transfer the third unique fingerprint attribute from the edge system to the first and second endpoints, wherein the edge system terminates the first WebRTC communication between the first and second endpoints.

15. The edge system of claim 12, wherein the identification information is received from a WebRTC application system that facilitates the first WebRTC communication.

16. The edge system of claim 12, wherein the first instruction is included in the first two or more RTP packets of the copies of the packets that are transferred.

17. The edge system of claim 12, further comprising:
the processing system configured to include additional information related to the first WebRTC communication in the RTP extension.

18. The edge system of claim 12, wherein the processing system configured to record the packets to the storage system further comprises the processing system configured to:
after at least the first RTP packet is transferred, include a second instruction to stop recording in the RTP extension of at least a second RTP packet of the copies of the packets, wherein the recording system stops storing the copies of the packets upon detecting the second instruction.

19. The method of claim 7, wherein the identification information is received from a WebRTC application system that facilitates the first WebRTC communication.

\* \* \* \* \*